United States Patent

Obata

[11] Patent Number: 6,058,085
[45] Date of Patent: May 2, 2000

[54] METHOD AND APPARATUS FOR IDENTIFYING AND SKIPPING DEFECTIVE SECTIONS

[75] Inventor: Hideo Obata, Kanagawa, Japan

[73] Assignee: Sony Corporation, Tokyo, Japan

[21] Appl. No.: 08/959,724

[22] Filed: Oct. 28, 1997

Related U.S. Application Data

[60] Continuation of application No. 08/579,838, Dec. 28, 1995, abandoned, which is a division of application No. 08/211,260, Mar. 25, 1994, Pat. No. 5,553,045, which is a continuation of application No. PCT/JP93/01072, Jul. 30, 1993.

[30] Foreign Application Priority Data

Jul. 31, 1992 [JP] Japan .................................. 4-205594
Nov. 2, 1992 [JP] Japan .................................. 4-294317

[51] Int. Cl.[7] ........................................................ G11B 3/90
[52] U.S. Cl. ............................................. 369/54; 369/58
[58] Field of Search ................................. 369/54, 58, 47, 369/48, 59, 32, 44.25, 44.26, 44.27, 44.32, 53; 360/53, 31

[56] References Cited

U.S. PATENT DOCUMENTS

| | | | |
|---|---|---|---|
| 5,132,956 | 7/1992 | Ichikawa | 369/58 X |
| 5,235,585 | 8/1993 | Bish et al. | 369/58 |
| 5,237,553 | 8/1993 | Fukushima et al. | 369/58 |
| 5,255,270 | 10/1993 | Yanai et al. | 369/58 X |
| 5,258,852 | 11/1993 | Kamijima | 369/58 X |
| 5,303,219 | 4/1994 | Kulakowski et al. | 369/58 X |
| 5,315,567 | 5/1994 | Fuji et al. | 369/48 |
| 5,351,227 | 9/1994 | Ichikawa et al. | 369/58 |
| 5,353,276 | 10/1994 | Schroder | 369/275.1 |

FOREIGN PATENT DOCUMENTS

| | | | |
|---|---|---|---|
| 0 127 311 | 12/1984 | European Pat. Off. | G11B 5/09 |
| 0 272 029 | 6/1988 | European Pat. Off. | G11B 20/18 |
| 60-202573 | 10/1985 | Japan | G11B 20/10 |
| 60-58670 | 3/1988 | Japan | G11B 20/10 |
| 63-63167 | 3/1988 | Japan | G11B 20/10 |
| 63-113979 | 5/1988 | Japan | G11B 20/12 |
| 63-179471 | 7/1988 | Japan | G11B 20/18 |

*Primary Examiner*—Paul W. Huber
*Attorney, Agent, or Firm*—Limbach & Limbach L.L.P.

[57] ABSTRACT

In the case where predetermined data is recorded on the disc in which divided clusters each having a predetermined section are formed in the track, when it is determined during recording that a cluster is a defective section, the recording is stopped and the recording begins again with a cluster offset from the defective cluster, whereby even if there is a partial defect in the track on the disc, the data can be recorded with accuracy.

6 Claims, 6 Drawing Sheets

METHOD AND APPARATUS FOR IDENTIFYING AND SKIPPING DEFECTIVE SECTIONS

This is a continuation of application Ser. No. 08/579,838 filed on Dec. 28, 1995, now abandoned, which is a Divisional application of 08/211,260 filed on Mar. 25, 1994, now U.S. Pat. No. 5,553,045, which is a Continuation of PCT/JP93/01072 filed on Jul. 30, 1993, for A DISC RECORDING APPARATUS AND A DISC RECORDING METHOD.

TECHNICAL FIELD

The present invention relates to a disc recording apparatus for recording a data on a disc such as a magneto-optical disc, an optical disc or the like and a recording method thereof.

BACKGROUND ART

Various kinds of disc recording apparatus for recording a data such as an audio data or the like on a magneto-optical disc and an optical disc have been put into practice in the prior art. When data are recorded on such disc, the data are successively recorded in tracks previously formed on the disc in a spiral or concentric fashion.

By the way, because of a scratch of a disc surface or the like, a disc such as the magneto-optical disc, the optical disc or the like sometimes has a defective portion at a predetermined portion of a track in which a data is recorded. In such case, even if the data is recorded at the defective portion, then an accurate reproduction thereof is difficult. If an audio signal, for example, is recorded, there is then such a fear that when the defective portion is reproduced, a reproduced sound breaks off and a noise is reproduced.

If the defective portion of the track is a very short section, then an original recorded data can be restored by an error correction and an interpolation processing of a reproduced data or the like, while if the defective portion is continued for a certain long section, then such restoration processing is difficult.

DISCLOSURE OF THE INVENTION

The present invention is made in view of such problems, and an object thereof is to provide a disc recording apparatus and a disc recording method in which a data can be recorded so that the data can be continuously reproduced even if a predetermined section of the track formed on a disc is a defective section.

According to a first invention, in a recording apparatus for recording a predetermined data on a disc in which clusters which are divided at a predetermined section are formed on a track, there are provided a memory means for once storing a data, a discriminating means for discriminating whether or not the above-mentioned cluster is a defective section, and a controlling means for performing if the above-mentioned discriminating means discriminates that the cluster under recording is defective, then the recording is once stopped and such control that a cluster offset by a predetermined cluster is calculated from the above-mentioned defective cluster and a data is read again from the above-mentioned memory means to begin the recording again from the above-mentioned calculated cluster. Therefore, if a cluster having a defective section is detected in a track formed on a disc, then the cluster having the defect is avoided and the data is accurately recorded so that the recorded data can be accurately reproduced upon reproduction.

According to a second invention, a program recorded by the above-mentioned recording apparatus is formed of one or a plurality of parts. The above-mentioned disc has a managing information area in which a managing information formed of at least a start address, an end address and a link information corresponding to each of the above-mentioned parts is recorded. If the cluster under recording is determined as a defective one, then control is performed in such a manner that an end of a cluster preceding the above-mentioned cluster determined as the defective one is defined as an end address and is registered as the first part in the above-mentioned managing information area and the cluster offset by a predetermined cluster is calculated from the above-mentioned cluster determined as the defective one, the end of the above-mentioned calculated cluster is defined as a start address and registered as the second part in the above-mentioned managing information area, and a link information of the first part indicates the above-mentioned second part. Therefore, by a recorded information in the managing information area of the disc, the cluster having the defective section is avoided and it can be easily controlled to continuously reproduce the recorded data.

According to a third invention, a defective area of the above-mentioned disc is formed of one or a plurality of parts. The above-mentioned disc has the managing information area in which the managing information formed of at least the start address, the end address and the link information corresponding to each of the above-mentioned parts is recorded. If the cluster under recording is determined as the defective one, then control is performed in such a manner that the start and the end of the above-mentioned cluster determined as the defective one are respectively defined as the start address and the end address and recorded in the above-mentioned managing information area. Therefore, the data can be reproduced by determination of the start address and the end address so that the defective portion should be avoided.

According to a fourth invention, the discriminating means for discriminating whether or not the above-mentioned cluster is the defective section is arranged so as to perform the discrimination by detecting turbulence of an error signal detected by an optical block for recording a data on the disc. Therefore, the defective section can be discriminated satisfactory.

According to a fifth invention, the discriminating means for discriminating whether or not the above-mentioned cluster is the defective section is arranged so as to perform judgement by detecting that a position information from a recording track is discontinuous. Therefore, the defective section can be discriminated satisfactory.

According to a sixth invention, in a disc recording method which records the predetermined data on a disc in which a cluster divided at a predetermined section is formed on a track, there are performed such a recording which is formed of a step of discriminating whether or not a data of a predetermined cluster amount is stored in a memory, a step of indicating a start of the recording in case of the data of the predetermined cluster amount being judged to be already recorded upon the above-mentioned discrimination, a step of discriminating a defect of the disc, a step of stopping the above-mentioned recording in case of the defect on the disc being discriminated upon the above-mentioned discrimination, a step of calculating a position offset by a predetermined length from the above-mentioned defective section, and a step of indicating another recording from the above-mentioned calculated position. Therefore, the recording in which the defective portion is avoided can be performed.

BEST MODE CARRYING OUT THE INVENTION

One embodiment of the present invention will hereinafter be explained with reference to the accompanying drawings.

Figure 1:
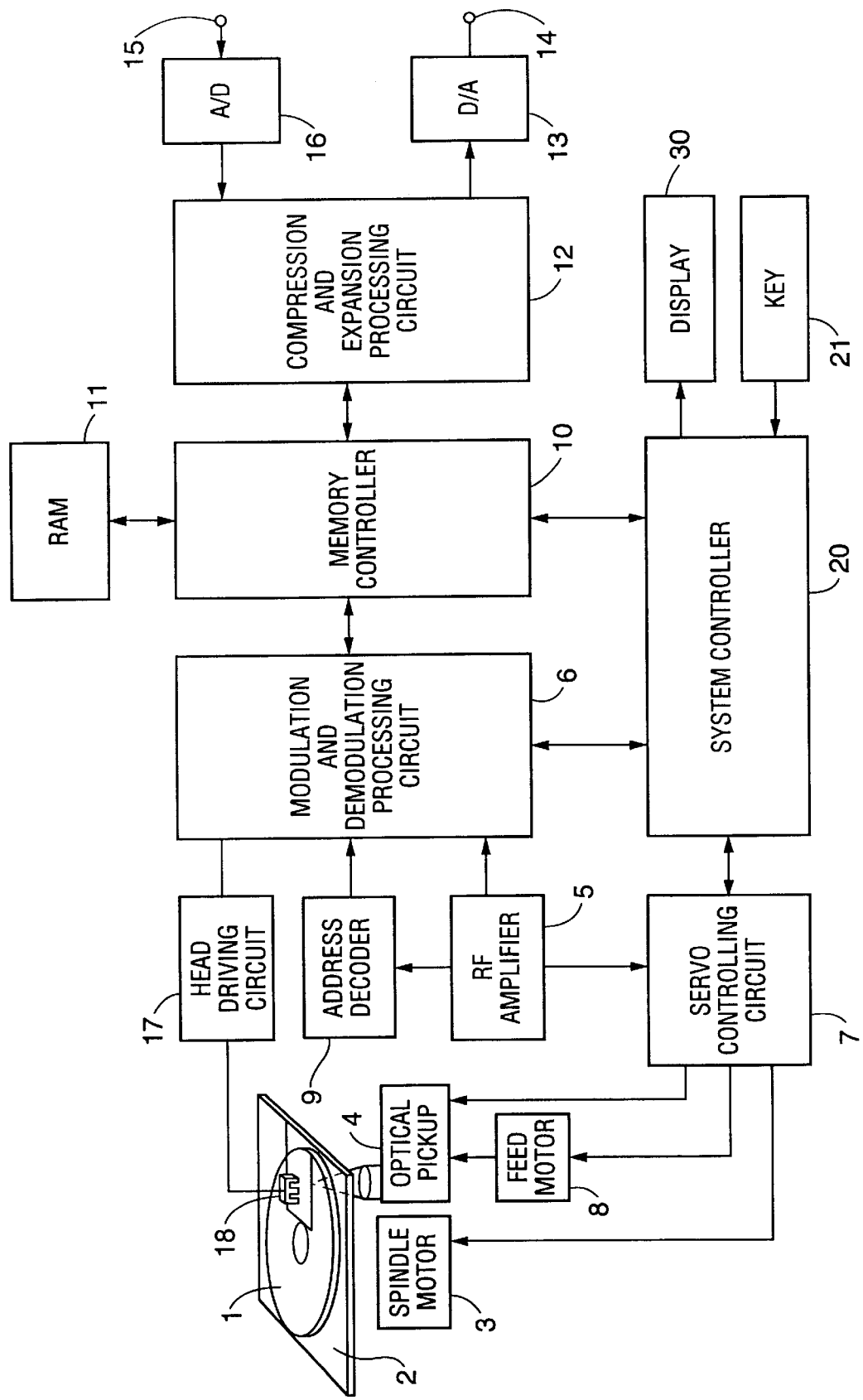
FIG. 1 is a structural diagram showing a recording and reproducing apparatus to which one embodiment is applied.

In the present embodiment, the present invention is applied to a recording and reproducing apparatus of a magneto-optical disc on which an audio data is recorded. Construction of the recording and reproducing apparatus is shown in FIG. 1. In FIG. 1, reference numeral (1) represents a magneto-optical disc. The magneto-optical disc (1) is loaded on the recording and reproducing apparatus and rotated by a spindle motor (3) and is housed in a cartridge (2). Then, a recorded signal recorded by a magnetic-field modulation method, which will be described later, on a track formed in a spiral fashion on the disc (1) is read by an optical pickup (4), and a reproduced signal is supplied through an RF amplifier (5) to a modulation and demodulation processing circuit (6) to demodulate the data modulated for the recording. As a processing of modulation and demodulation for the recording in the modulation and demodulation processing circuit (6), a digital modulation called an 8–14 modulation (EFM), for example, is performed. The processing in the modulation and demodulation processing circuit (6) is controlled by a system controller (20).

In each track formed on the magneto-optical disc (1), an address data is previously recorded by wobbling (meanderring), and this wobbling information is detected by an address decoder (9). That is, the reproduced signal output by the RF amplifier (5) is supplied to the address decoder (9), and the decoder (9) decodes the address data recorded by the wobbling to supply the decoded address data through the modulation and demodulation processing circuit (6) to the system controller (20).

The audio data demodulated by the modulation and demodulation processing circuit (6) is supplied to a memory controller (10) and once stored in an RAM (11) connected to the memory controller (10). The RAM (11) is a data buffer for continuing an output of the audio data in case of the reproduced data being broken temporarily, and the data stored in the RAM (11) is supplied to a compression and expansion processing circuit (12). Then, the data compressed for the recording is expanded into an original data amount thereof by the compression and expansion processing circuit (12), and the expanded data is converted by a digital/analog converter (13) into an analog audio signal to supply the analog audio signal to an audio signal output terminal (14).

Further, the movements of the optical pickup (4) and a recording head (18), which will be described later, in a radius direction of the disc are carried out by the drive of a feed motor (8) under the control of a servo controlling circuit (7) based on a command from the system controller (20). The servo controlling circuit (7) is supplied with the reproduced signal output from the RF amplifier (5) and performs servo control to make the optical pickup and the recording head follow the reproducing track. The spindle motor (3) is also rotated by the control of the servo controlling circuit (7).

The recording system is constructed such that after the analog audio signal obtained at an audio signal input terminal (15) is converted by an analog/digital converter (16) into a digital audio data, the digital audio data is subjected to a compression processing by the compression and expansion processing circuit (12), the compressed audio data is supplied to the memory controller (10) and once stored in the RAM (11) connected to the memory controller (10), the audio data read out from the RAM (11) is modulated for the recording by the modulation and demodulation processing circuit (6), and the modulated audio data is supplied to a head driving circuit (17) to drive the recording head (magnetic head) (18).

The recording head (18) is disposed just above a position where a laser is irradiated on the disc (1) from the optical pickup (4) (opposite side of the disc). Upon recording, there is performed a processing in which a magnetic field generated by the recording head (18) is recorded while a recording portion is heated by a laser beam irradiated on the disc (1) from the optical pickup (4). The recording processing is one called a magnetic-field modulation recording system.

The system controller (20) is connected with an operation key (21), and the recording and reproduction are controlled on the basis of an operation by the operation key (21). Further, the system controller (20) is connected with a display unit (30) formed of a liquid crystal display, which displays a data concerning the recording and reproduction by a letter, a number or the like.

Upon the recording of the data, the system controller (20) also discriminates existence or absence of a defect of a track under recording. That is, during the recording of the data, the wobbling information (the address data) of the track under recording which is read by the optical pickup (4) is detected by the address decoder (9). The address data detected by the address decoder (9) is checked by the system controller (20) during recording, which discriminates whether or not the detected address is kept continued and determines a portion lacking the address data as the defective section in case of existence of a portion where the detected address is discontinuous. A state of a tracking error signal (signal indicating the tracking of the recording track) detected by the servo controlling circuit 7 on the basis of the signal read by the optical pickup (4) is discriminated by the system controller (20), which also determines a corresponding portion as the defective section in case of detection of a large turbulence of the tracking signal.

On the magneto-optical disc (1) of the present embodiment, a subdata can be recorded besides the audio data. The subdata is recorded in a most inner periphery track in a predetermined format. Before the audio data is recorded on and reproduced from the magneto-optical disc (1) (for example, when the disc (1) is loaded on the recording and reproducing apparatus), the subdata recorded in the predetermined track is reproduced and then stored in a memory in the system controller (20). Then, a recording address and a reproducing address for the recording and reproduction, respectively, are controlled on the basis of the subdata. When the audio data is recorded, there is performed such a processing that a data such as a recorded address or the like is added to the subdata (that is, the subdata of a corresponding area is processed for updating). Only the subdata is often updated by an editing or the like.

Figure 2:
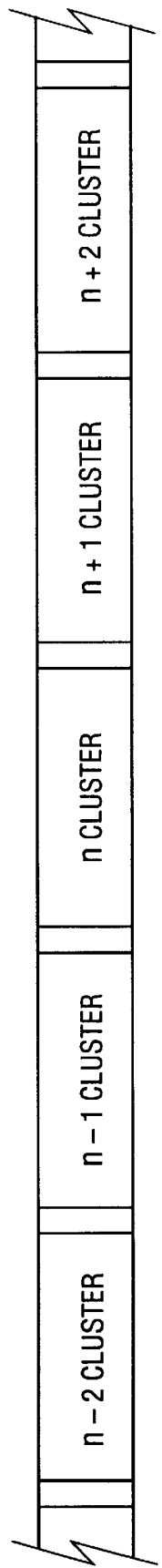
FIG. 2 is an explanatory diagram showing a cluster forming state according to one embodiment.

Content of the subdata and data arrangement thereof will be explained here. As the content of the subdata, a setting state of the track number set in the disc (1), the address data of each track number and a data concerning kinds of the recorded data are recorded. As the address data in this case, data of the cluster number and the sector number are recorded. The cluster will be explained. The track formed on the disc (1) is divided into predetermined sections which are defined as clusters, and as shown in FIG. 2, successive numbers are given to each cluster starting from the inner periphery side (in FIG. 2, reference letter n represents a cluster number). When the data is recorded, the recording is performed by defining one cluster as a minimum unit. The subdata thus recorded in the most inner periphery track is called a TOC (Table of Contents: index informations).

Figure 3:
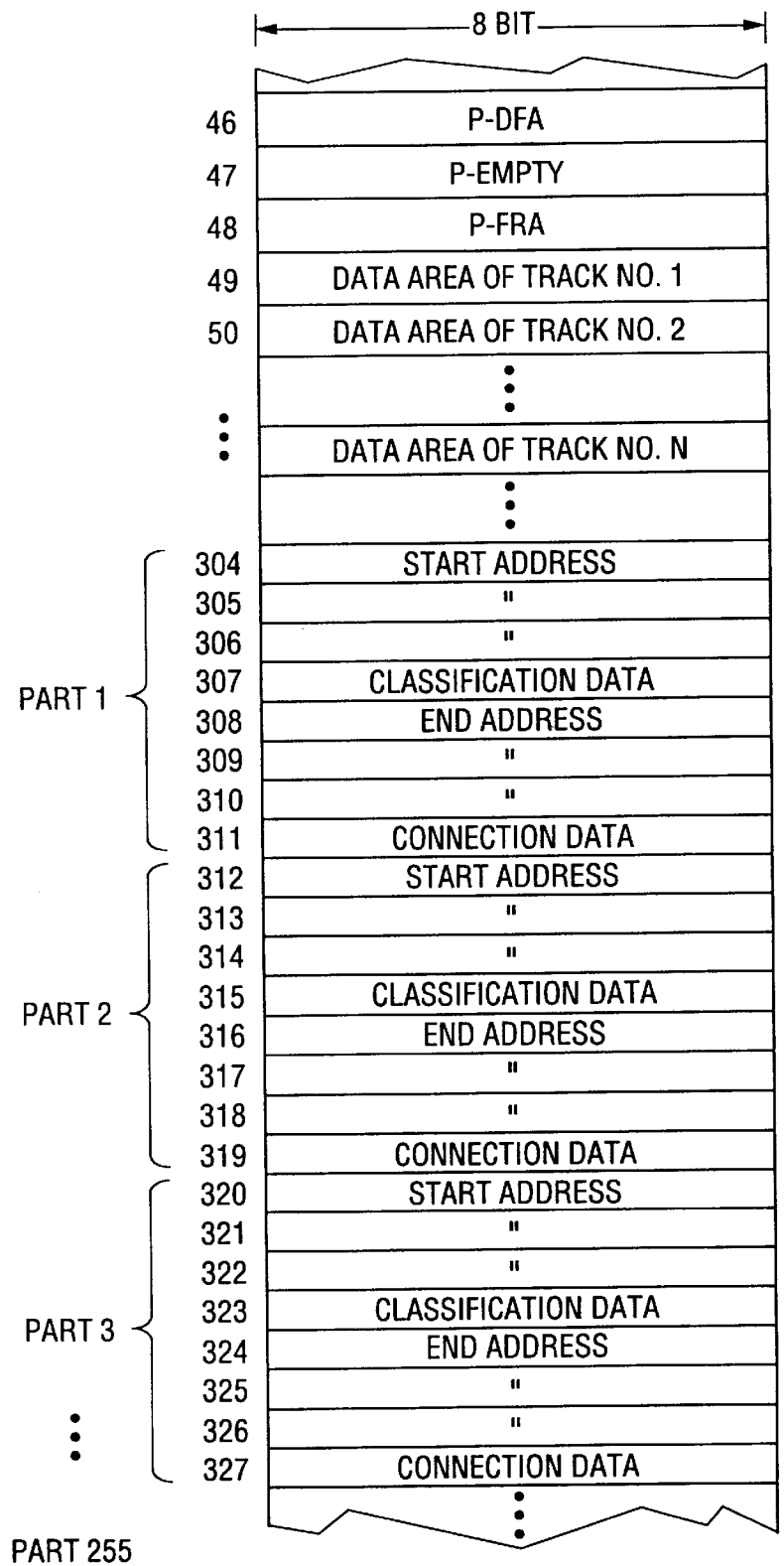
FIG. 3 is a structural diagram showing an address-data storing state according to one embodiment.

Each subdata is divided into areas each having 8 bits and recorded as shown in FIG. 3. The track number described here is the number given to each of recording units into which the audio data recorded on the disc (1) is divided, for example, the number given to every song in case of music being recorded in one disc. The number does not have any direct relation with the track number of the data recording track formed on the disc (1).

A block of the audio data of the above-mentioned one recording unit is defined as a program.

The data to be recorded on the disc is not required to be recorded with physically continuous addresses and may be discretely recorded.

Figure 4:
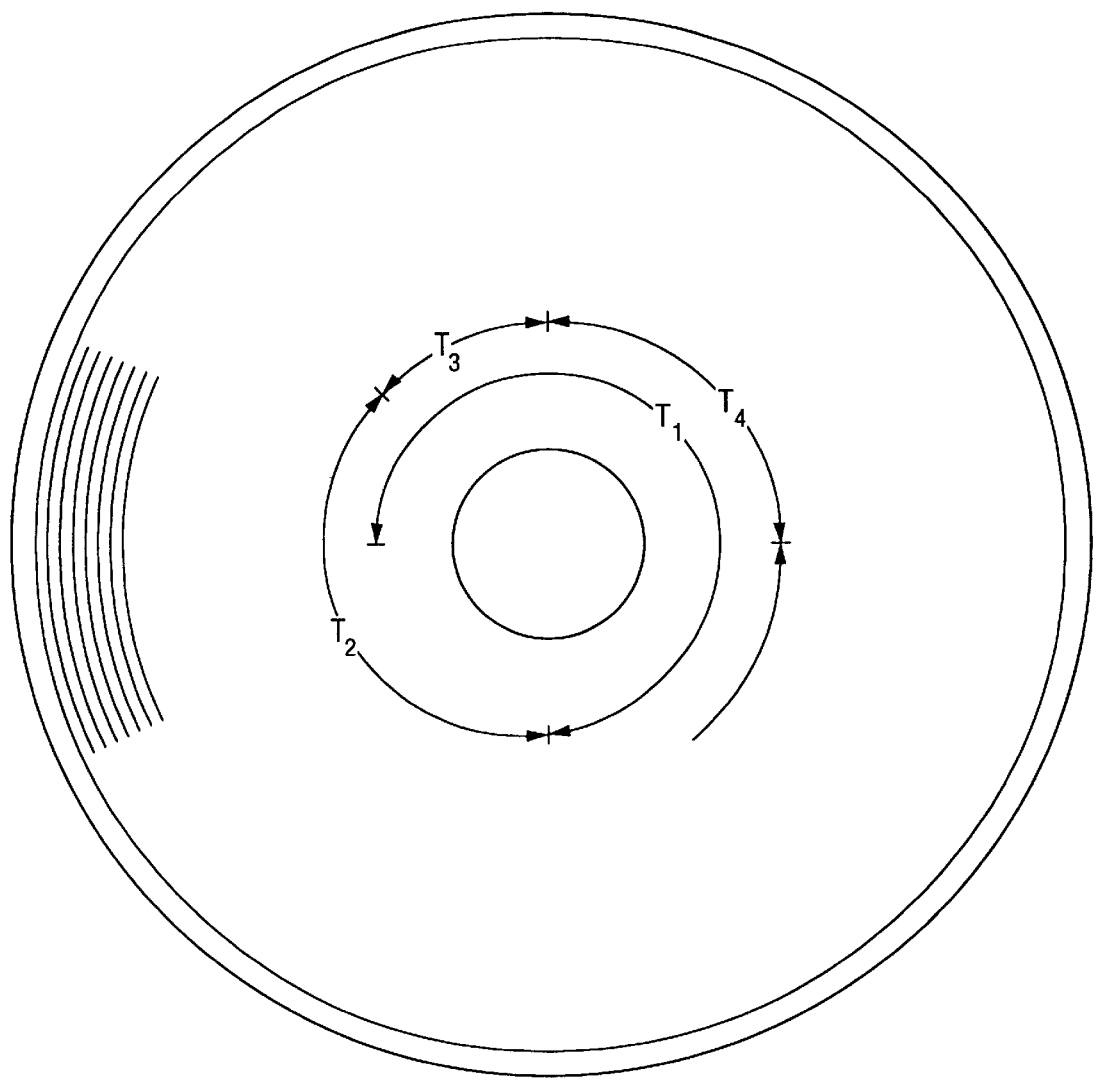
FIG. 4 is a schematic diagram used to explain a track forming state according to one embodiment.

For example, in a disc represented by a conventional compact disc or the like, as shown in FIG. 4, the data is continuously recorded in such a manner that the first music of the track number is defined as T1 and the second music thereof is defined as T2. However, the data may be discretely recorded, so that as shown in FIG. (5), the data can be discretely recorded on the disc as shown by T4 (1) to T4 (4) and T5 (1) to T5 (4) which are respectively defined as the fourth music of the track number and the fifth music thereof. (FIGS. 4 and 5 are schematically shown, and practically one section is recorded in a concentric or spiral fashion over several to several hundred circles.)

Figure 5:
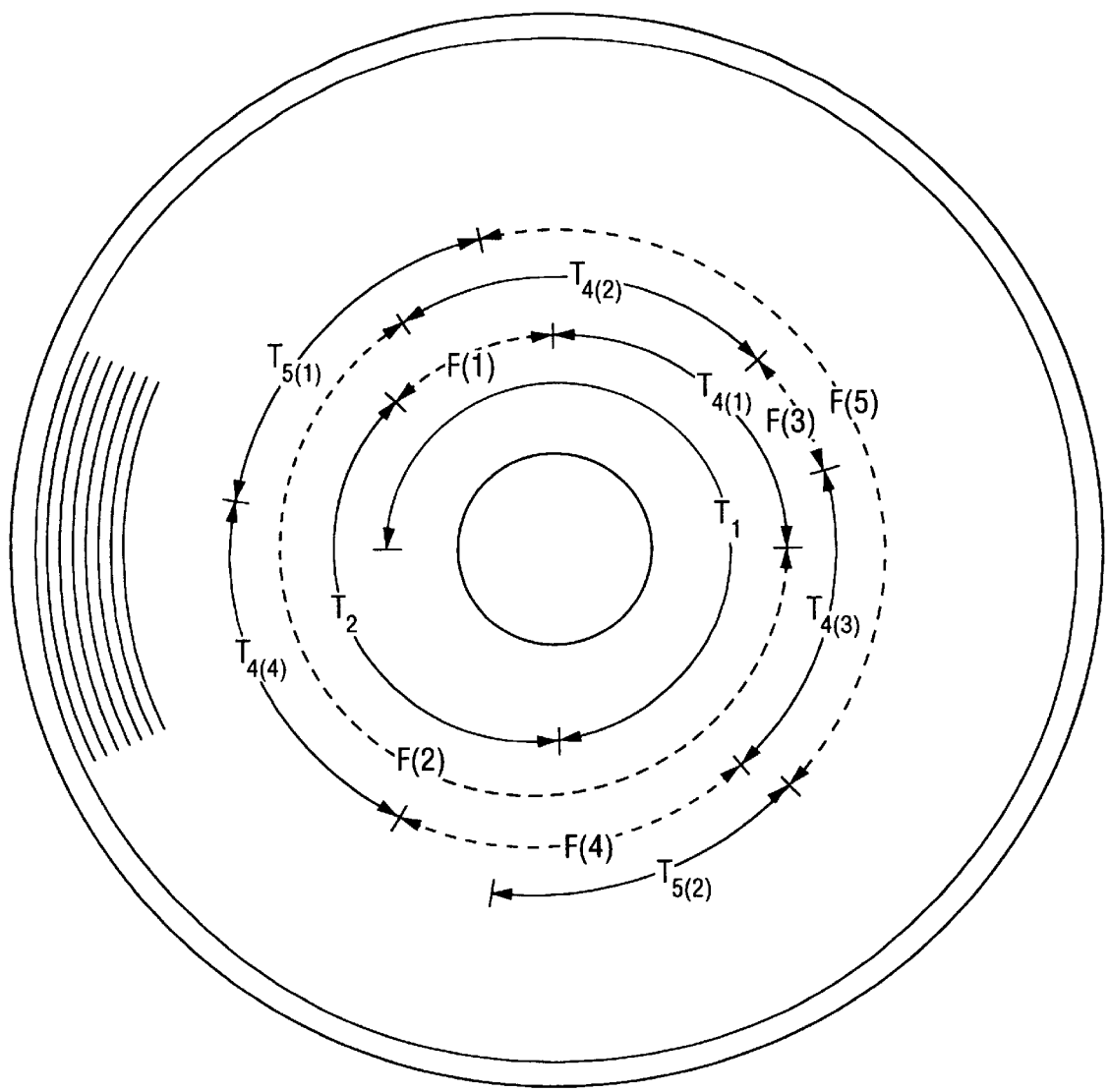
FIG. 5 is a schematic diagram used to explain the track forming state according to one embodiment.

The reason why the data can be discretely recorded as described above is that since the data is once stored in the RAM (11) and then recorded on the disc, even if the recording head is accesses T4 (2) of the fourth music from T4 (1) thereof and then the data thereof is recorded on the disc as shown in FIG. 5 mentioned above, there is enough time for such process.

The TOC (Table of Contents: the index informations) managing the above-mentioned discretely recorded data is formed of the address data at every track number and the data concerning the kind of the recorded data.

As shown in FIG. 3, if N audio data from the track number 1 to the track number N (reference letter N represents an optional integer) are recorded on the disc (1), then a data indicating which area the address data of the track number 1 is stored in is recorded in an area 49, and hereinafter data indicating the recording areas of the address data of the corresponding track numbers to the track number N are successively recorded in the areas one by one.

After an area 304, eight areas are used as one set, and the one unit is defined as a part.

In the part, a start address of the part is recorded in the first three areas. A classification data is recorded in the next one area. An end address of the part is recorded in the next three areas. A connection data is recorded in the next one area.

The above-mentioned part corresponds to one block of the discretely recorded data (T4 (1) in FIG. 5, for example, or the like), for example.

The above-mentioned start address and end address correspond to an absolute address of one block of the discretely recorded data on the disc, for example.

If one track number is divided and recorded in a plurality of parts, then the above-mentioned connection data is a data for connecting the respective parts. If music of corresponding track number is formed of one or a plurality of parts, then 00 is recorded as the connection data of the last part, so that 00 is discriminated to thereby determine the end of the music.

As the classification data, classification of the audio data to be recorded (distinction between a stereophonic data and a monophonic data, existence or absence of a copy guard, on or off of emphasis or the like) is recorded.

In the above-mentioned description, construction of the TOC (Table of Contents: the index informations) about a recorded area has been described, while construction of the managing information about a recordable area will hereinafter be explained.

As shown in FIG. 3, there is recorded a P-FRA (Pointer for the Freely Area) 48 indicating which address on the above-mentioned index information the recordable area begins with. In the P-FRA, the address in the above-mentioned index information indicating a part corresponding to a head of the recordable area (which corresponds to an F(l) shown by a broken line in FIG. 5, for example) is recorded.

In the above-mentioned indicated part, a start address of the recordable area is recorded. A classification data is recorded in the next one area. An end address of the part is recorded in the next three areas. A connection data is recorded in the next one area. If the recordable areas discretely lie on the disc (see FIG. 5), the respective recordable areas are connected to each other by the connection data. Upon recording, the recording is performed while the above-mentioned index informations are retrieved.

As shown in FIG. 3, a P-DFA (Pointer for the Defective area) 46 indicating a defect on the disc is further recorded in the above-mentioned index information. In a similar way to the above-mentioned P-FRA, an address in the index information managing the defective area on the disc is stored therein, so that the connection data of the part indicated by the above-mentioned address is searched, whereby it can be managed where the defective area is located on the disc.

Further, as shown in FIG. 3, 255 parts as the index information can be managed, and a P-Empty (Pointer for the empty slot on the parts table) 47 indicating a use state of the above-mentioned part is recorded. The above-mentioned P-Empty indicates a head part of unused parts in the above-mentioned index information, and the unused parts are connected to each other by the connection data.

It is needless to say that the parts of the above-mentioned recorded areas, the parts of the above-mentioned recordable areas, the parts of the defective areas and the unused parts are mixedly recorded on the same index information.

It is needless to say that the sum of the number of the parts used in the above-mentioned recorded area, the number of the parts used in the above-mentioned recordable areas, the number of the parts in the defective area and the number of the unused parts becomes 255.

Figure 6:
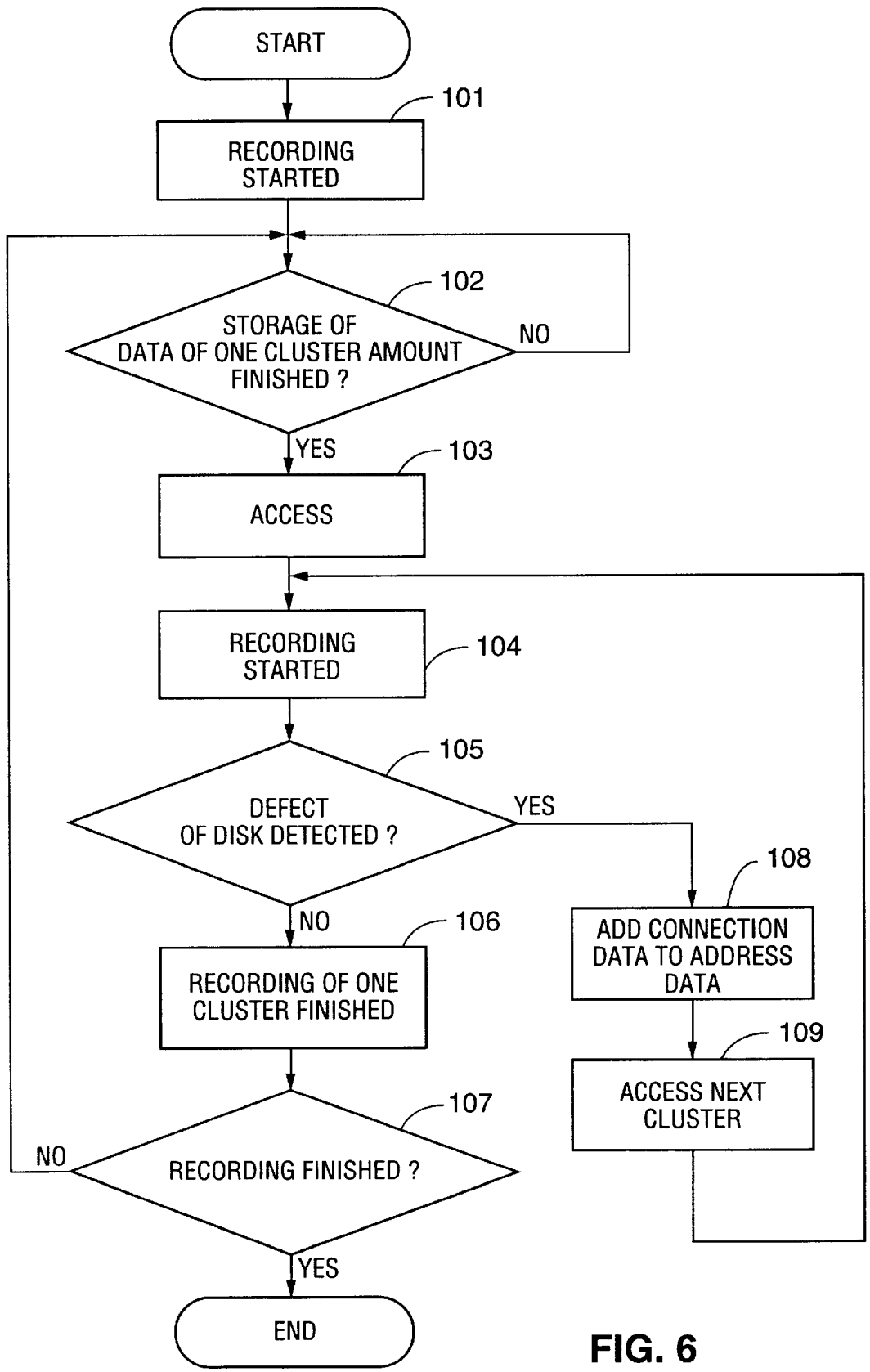
FIG. 6 is a flowchart showing a recording processing according to one embodiment.

When the data is recorded by the recording and reproducing apparatus of the present embodiment, on the basis of the result such that the system controller (20) discriminates existence or absence of the defect of the track under recording, the recording address is controlled so that the recording is carried out except for the defective section. A processing upon recording in case of the recording of the audio signal will hereinafter be explained with reference to a flowchart in FIG. 6.

If there is a command for starting the recording (at step 101), then it is determined whether or not a recording data of one cluster unit which is a minimum unit of the recording data is stored in the RAM (11) (at step 102). If the recording data of one cluster amount is stored therein, then the optical pickup (4) and the recording head (18) access a cluster on the disc (1) in which the data can be recorded (at step 103) and the recording of the data is started (at step 104). At this time, it is simultaneously determined from discontinuity of the reproduced address data and the turbulence of the tracking error signal whether or not a section having a defect is detected (at step 105). If the defect is not detected, then the recording is continued as it is. When the recording of one cluster amount is finished (at step 106), it is determined whether or not the recording is continued (at step 107). If it is determined that the recording is continued, then the process is returned to step 102 and the recording in each cluster is continued. Alternatively, if it is determined at step 107 that the recording is stopped, then the processing for finishing the recording is performed. As the processing for finishing the recording, there is performed such processing that the number of the head cluster of the recorded clusters and the number of the last cluster thereof are added to the subdata as the start address and the end address of the address data recorded in the most inner periphery track (see FIG. 3), respectively.

If the section having the defect is detected at step 105, then the recording at this time is stopped and data of the start address and the end address of the address data to be recorded in the most inner periphery track (see FIG. 3) are made (at step 108) on the basis of the recording state up to the last cluster recorded. At this time, the connection data is added following the end address, and the connection data indicates the part number which begins with a cluster two-cluster ahead. The data of one cluster amount stored in the RAM (11) is recorded in the cluster two-clusters ahead (at step 109). After the recording of the data of the one cluster amount is finished, the process is returned to a data recording processing for the next cluster.

A processing upon the detection of the defect will concretely be explained. When the clusters are formed as shown in FIG. 2, for example, if the defect is detected in the recording track in n cluster, then the address data is added at step 108, whereby the previous n−1 cluster is defined as the end address and the connection data indicates such part number that the recording begins with an n+1 cluster (one-cluster ahead). Then, the recording is continued from the n+1 cluster.

The recording processing is thus performed, whereby if there is the defective section, then such processing is performed where the data is recorded with the cluster having the defect being avoided and the connection data added to the address data directs reproduction in continuous clusters before and after the cluster having the defective section. Accordingly, when the disc on which the data is thus recorded is reproduced, if a cluster just preceding the defective section is reproduced, then the address data directs a skip to the next cluster, so that the processing for continuing the continuous recording from the cluster next to the defective section is performed. Therefore, even if the disc (1) has a partial defect, then the data can be correctly recorded and reproduced without causing the lack of the recording data.

In this case, in the recording and reproducing apparatus of the present embodiment, the reproduced data is once stored in the RAM (11) and then subjected to an expansion processing to reproduce the same, so that if an access position of the optical pickup (4) is moved by one cluster amount while the reproduced data is stored in the RAM (11), then the sound to be reproduced is prevented from breaking off.

In the present embodiment, the defective section is discriminated by detecting the turbulence of the tracking error signal detected by the optical system and detecting the discontinuity of the address information reproduced from the recording track, so that the defective section can be discriminated with satisfactory accuracy.

The defective section may be discriminated in such a manner that when there is the turbulence of the tracking error signal or the discontinuity of the address information, the cluster is not immediately discriminated as the defect, but after the recording in the same cluster is repeated a predetermined times, and when the cluster is repeatedly discriminated as the defect, the cluster is determined to be a defective section. Such arrangement allows the defective section to be more reliably discriminated.

In the above-mentioned embodiment, if there is the defective section, then the defective section is not registered especially in the index information and dealt with as an unmanaged information, while the defective section may be defined as the above-mentioned P-DFA (Pointer for the Defective area) 46 indicating the defect on the disc to register the above-mentioned defective cluster as the part.

When the defective section is registered as the above-mentioned defective cluster, the P-Empty which is the unused part is retrieved to record the start address and the end address of the above-mentioned defective cluster in the above-mentioned unused part and if the defective section is the first defective area, then the address data of the above-mentioned registered part is recorded in the P-DFA.

In the present embodiment, when there is the defective section, only the cluster having the defective section is skipped and the recording begins with the next cluster, while the recording may be continued from the cluster other than the cluster next to the defective section.

Further, while in the present embodiment the address data is all recorded only in the most inner periphery track, the address data may be recorded in another portion.

Further, while in the present embodiment the recording processing of the disc on which the audio data of music or the like is recorded has been explained, it is needless to say that the present invention can be applied to the case where another data such as a video data, a program data or the like are recorded on the disc.

I claim:

1. A disc recording apparatus, comprising:

a disc shaped recording medium having tracks that are divided into a plurality of sections;

means for recording data to said disc;

discriminating means for discriminating whether the section of the disc under recordation is defective, the discriminating means utilizes turbulence of an error signal for said discrimination of the section for a defect, wherein said turbulence of said error signal is detected by an optical block for recording data on the disc, said discriminating means sensing defective sections by sensing a turbulence of said error signal exceeding a predetermined amount; and controlling means for controlling said recording means wherein if said discriminating means discriminates that the section under recording is a defective one, then the recording is stopped and a section offset is calculated from said defective section to identify a calculated section that follows said defective section, and said recording means is moved to said calculated section where recordation begins again;

wherein said calculated section immediately follows said defective section on said disc.

2. The disc recording apparatus of claim 1, wherein said error signal is a tracking control error signal.

3. The disc recording apparatus of claim 1 further comprising:

a managing information area located on said disc that contains at least a start address, an end address and link information corresponding to different parts of a recorded program recorded on the disc, wherein during recordation, if the section of the disc under recordation is determined to be defective, then said controller stops recordation at the section preceding the defective section and said preceding section is defined as an end address of one of said parts and is registered as such in said managing information area, and the section offset is calculated from said preceding section to identify the calculated section which is defined as a start address of another of said parts and is registered as such in said managing information area, and link information of said one part to said other part is recorded in said managing information area.

4. The disc recording apparatus of claim 3, wherein said error signal is a tracking control error signal.

5. A recording method for recording predetermined data on a disc having tracks which are divided into predetermined sections, the recording method comprising the steps of:

commencing recordation of the data into the sections on the disc;

discriminating whether a section subject to recordation is defective by utilizing turbulence of an error signal wherein said turbulence of said error signal is detected by an optical block for recording data on the disc, said discriminating step sensing defective sections by sensing a turbulence of said error signal exceeding a predetermined amount;

stopping said recording in case of a defect being discriminated in a section subject to recordation on the disc;

calculating a position offset by a predetermined length from said defective section; and restarting the recording from said calculated position again;

wherein said calculated position is a beginning of a section immediately subsequent to said defective section on said disc.

6. The recording method of claim 5, wherein said error signal is a tracking control error signal.

* * * * *